(12) United States Patent
Friedrich et al.

(10) Patent No.: US 6,561,324 B2
(45) Date of Patent: May 13, 2003

(54) DRIVE UNIT INCLUDING A MOTOR AND A RETARDER

(75) Inventors: Jürgen Friedrich, Crailsheim (DE); Klaus Vogelsang, Crailsheim (DE); Peter Heilinger, Crailsheim (DE); Peter Rose, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/968,061

(22) Filed: Oct. 1, 2001

(65) Prior Publication Data

US 2002/0148691 A1 Oct. 17, 2002

Related U.S. Application Data

(63) Continuation of application No. 09/142,401, filed on Mar. 4, 1999, now abandoned.

(30) Foreign Application Priority Data

Mar. 8, 1996 (DE) .......................... 196 09 150
Sep. 12, 1996 (DE) .......................... 196 37 316

(51) Int. Cl.⁷ ............................................. F16D 57/02
(52) U.S. Cl. ........................ 188/296; 477/183; 477/203
(58) Field of Search ................................ 188/296, 293, 188/140 A; 192/58 R; 477/183, 184, 203, 204, 205, 206, 207, 208, 209

(56) References Cited

U.S. PATENT DOCUMENTS 3,367,461 A   2/1968   Nagel .......................... 192/35
3,650,358 A   3/1972   Bessiere ..................... 188/296
3,720,372 A   3/1973   Jacobs ..................... 237/12.3 B
5,657,838 A * 8/1997  Vogelsang et al. .......... 188/154
5,762,582 A * 6/1998  Friedrich et al. ........... 188/290
6,167,993 B1 * 1/2001 Adams et al. .............. 188/296

FOREIGN PATENT DOCUMENTS

| CH | 186 721 | 2/1937 |
|---|---|---|
| DE | 33 01 560 C1 | 4/1984 |
| DE | 37 13 580 C1 | 4/1987 |
| DE | 44 15 031 C1 | 5/1995 |
| DE | 44 46 288 A | 6/1995 |
| DE | 44 47 166 A | 6/1995 |
| DE | 44 94 721 T1 | 10/1995 |
| EP | 0707 140 A1 | 8/1995 |

* cited by examiner

Primary Examiner—Pam Rodriguez
(74) Attorney, Agent, or Firm—Taylor & Aust, P.C.

(57) ABSTRACT

A drive unit includes a motor, a hydrodynamic retarder, at least one pump, at least one feed line for feeding operating medium to the retarder, and at least one bypass line which conveys operating medium past the retarder. A device for directing the flow of operating medium is arranged upstream of the retarder in the direction of flow. The device can feed the operating medium through the retarder via the feed line, feed the operating medium past the retarder via a bypass line, or divide the total flow of operating medium into at least two predetermined parts. A first predetermined part of the operating medium is fed through the retarder via the feed line. A second predetermined part of the operating medium is conveyed past the retarder via the bypass line.

20 Claims, 14 Drawing Sheets

DRIVE UNIT INCLUDING A MOTOR AND A RETARDER

This is a continuation of application Ser. No. 09/142,401 filed Mar. 4, 1999 now ABN.

BACKGROUND OF THE INVENTION

1. Field of the Invention

The present invention relates to a drive unit and a control unit for the adjustment of the braking torque of the drive unit, as well as method for controlling the drive unit.

2. Description of the Related Art

A drive unit in generic terms is known from German patent document no. DE 37 13 580 C1.

On that particular known drive unit, the retarder serves to circulate the coolant in the coolant circuit during normal traction operation as well as during continuous braking operation ("water pump-retarder"). In this method, the retarder is controlled by a suitable valve arrangement so that it may also provide a braking function if necessary. During the "pumping" function, the power requirement should be as low as possible, while during the "braking" function, it should be as high as possible. The technical requirements, therefore, are very conflicting. This results in the power consumption of the "pumping" function being too high for sufficiently efficient operation.

However, if these two functions are structurally separated by providing a separate pump in addition to the retarder, then the retarder and the pump can be designed such that the functions can be performed with optimal efficiency. However, the space requirement for such a system is too high. This is a disadvantage since space in vehicles is very tight, especially at the pertinent location.

A retarder known from U.S. Pat. No. 3,720,372 is integrated with the drive motor, is permanently connected with the crankshaft, and has coolant from the cooling unit continuously flowing through it. The retarder rotor functions as a circulating pump in this situation, rather than utilizing a separate coolant pump. The purpose of this equipment is to heat the coolant by use of the retarder in order to warm the passenger compartment. This purpose is also facilitated by a control unit which is provided at the retarder and which serves only to control the distribution of the coolant depending on its temperature in a bypass line through the cooler.

A retarder is further known from German patent document no. DE-PS 33 01 560 which is connected with the crankshaft of the drive motor and the vehicle's traction wheels through a shiftable coupling. The purpose of the retarder, however, is not the pick-up and conversion of high kinetic brake energy into heat. The retarder is operated only as a heating device whereby the heating capacity is to be controlled under consideration of an available drive capacity. The motor coolant is, at the same time, the operating fluid for the retarder.

A retarder which is known from German patent document no. DE-AS 1 946 167 is connected directly with the crankshaft of a combustion engine whose coolant also serves as operating fluid for the retarder. The advantage of this operational mode is that the developed heat is generated directly in the coolant that is fed into the cooler, making a heat exchanger between two fluids dispensable.

German patent document no. EP 95113594 describes a drive unit with a motor and a hydrodynamic retarder. A pump impeller, which is arranged axially to the rotor blade wheel, is provided for transportation of the coolant.

SUMMARY OF THE INVENTION

The present invention provides a drive unit of the type described above, whereby optimum operation of the drive unit is possible under all operating conditions. Particular emphasis is on the requirement of being able to variably adjust the retarder's torque within a large range so that a large adjustment range results for the braking torque during brake operation.

According to the method of the invention, a large control range is provided for the retarder and a predetermined braking torque is established for the retarder. The braking torque is then adjusted so that devices for controlling the flow through the feed line to and through the retarder, as well as through the bypass line past the retarder, are triggered such that an initial predetermined part of the operating medium is fed through the retarder and a second predetermined part is fed past the retarder.

In addition to the method for controlling the braking torque, the invention also provides an appropriate control unit. In advancing the invention further, provisions can be made so that the feed lines and bypass lines are part of a combined cooling and braking circuit, or merely part of a coolant circuit.

By using conventional components, the two connected, previously mentioned circuits may be produced. With the assistance of suitable devices, the two circuits can be supplied with operating medium in such a manner that they are always being operated in an optimum braking, as well as non-braking mode. In one embodiment, the device or the control element for supplying the various circuits includes a valve.

In a first design variation, the valve takes the form of a two-position selector valve, whereby operating medium in the first position is fed through the bypass line. In one embodiment, operating medium is only in the cooling circuit. In the second position, the operating medium is routed through the feed line and thereby into the combined cooling and braking circuit, providing a selective supply of one or the other circuit. In such an arrangement, control of the braking torque is only possible between the maximum retarder braking torque and a minimum retarder braking torque since water is continuously flowing through the retarder. A lower deviation of the minimum retarder braking torque of the operating medium at the established flow in the combined cooling and braking circuit is not possible in this design variation because of the external resistivity. The aforementioned valve is used to select between two operational conditions, either only cooling operation or combined cooling and braking operation, and can be arranged as a ⅔ selection valve.

The minimum retarder braking torque ($MRet_{min}$) results at a predetermined total coolant flow volume in the combined cooling and braking circuit. In order to be able to reduce the retarder's braking torque below $MRet_{min}$, provisions may be made to permit intermediate positions between only cooling operation and combined cooling-braking operation, in place of selective switching. This results in a first partial flow of a predetermined part of the total coolant flow which is fed through the hydrodynamic retarder. In other words, the first partial flow of coolant is run in the combined cooling-braking arrangement, and a second predetermined part of the total coolant flow is routed only in the cooling circuit arrangement.

Possible devices that may help achieve the aforementioned result can, again, be valves which permit division of the total flow. For example, in the preferred design, these devices may be selector valves with at least three selection positions. The first position serves to route the operating medium only through the cooling circuit. In the third position, the operating medium is routed only through the combined cooling-braking circuit. In the second position, which is the aforementioned center position, the cooling flow can be separated into a first partial flow to be run in the cooling circuit and a second partial flow to be run in the cooling-braking circuit. It would, of course, be possible to provide a continuously adjustable division of the total flow in the second control position, or to effect settings other than those described. In a preferred design form, a selector valve, such as the one described above, is arranged as a 3/2 selector valve which is arranged as a valve having three connections and three positions.

In addition to arranging the valve as a selector valve, it is also possible to arrange it as a continuously regulating valve, also known as continuous valve. A continuous valve, perhaps with the assistance of a piston, permits continuous regulation of the partial flows for the cooling circuit or for the combined cooling-braking circuit. Such an arrangement distinguishes itself in that it is particularly simple.

In another embodiment of the invention, a simple branching arrangement with downstream throttles can be used in place of the valve arrangement to regulate the ratios of the partial flows in the cooling circuit as well as in the combined cooling-braking circuit by appropriate adjustment of the throttles.

Through the invention, it can further be guaranteed that the operating medium circulates substantially without losses during non-braking operation.

Through a combination of cooling and braking circulation, the hydrodynamic performance potential of the pump may be used to activate the retarder. This is possible without having to change the hydrodynamic ratios.

In contrast to the arrangement in which the feed line to the retarder is part of a combined cooling/braking circuit and the bypass line is part of the cooling circuit, in another embodiment of the invention, the feed line and bypass line are only part of an operating medium circuit. The operating medium circuit can be, for example, part of an oil circuit with a secondary retarder. In the apparatus according to the invention, or in the method according to the invention, the control range for the adjustable retarder braking torque may also be increased in such an arrangement.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
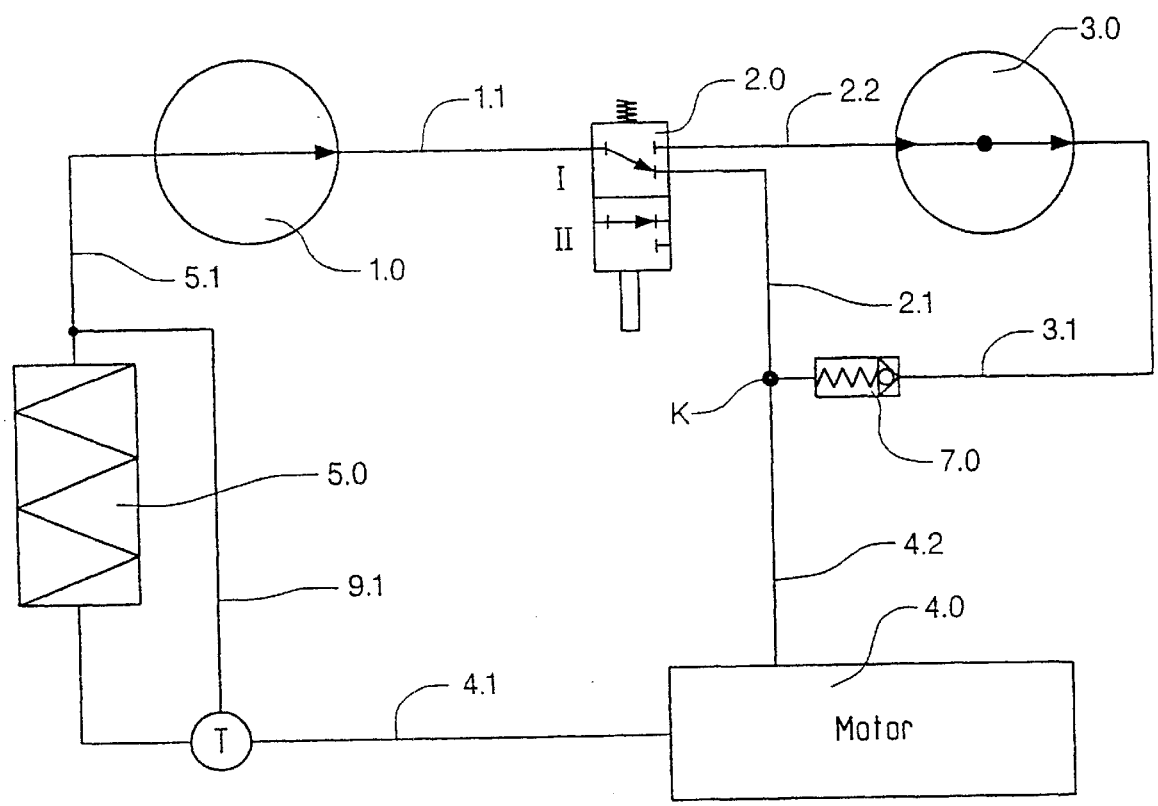
FIG. 1 is a schematic view of a first embodiment of a drive unit of the present invention, including a pump in the cooling circuit with a primary retarder.

Referring now to the drawings and particularly to FIG. 1, there is shown a drive unit, wherein the operating medium of the retarder is also the cooling medium of the motor. The drive unit includes a coolant circuit having a pump 1.0. Downstream from the pump 1.0, as viewed in the operating medium flow direction, a valve 2.0 is installed, which in this instance is arranged as a 3/2 selector valve. The drive unit further includes a hydrodynamic retarder 3.0, a motor 4.0 and a cooler 5.0. In the embodiment shown, the hydrodynamic retarder 3.0 is a primary retarder, whereby no limitations are visible here.

The individual units are connected by several lines, including a line 1.1 connecting pump 1.0 with valve 2.0. Lines 2.1 and 4.2 provide a connection between valve 2.0 and motor 4.0. A further line 2.2 connects valve 2.0 with retarder 3.0. A return valve 7.0 is installed in line 2.1. When in bypass mode, i.e., when the selector valve 2.0 is in position I and the operating medium is routed past the retarder 3.0, return valve 7.0 prevents operating medium from flowing back into the retarder 3.0 at junction K, thereby unintentionally filling it. Water can be included in the operating medium.

Lines 3.1 and 4.2 connect retarder 3.0 with motor 4.0. A line 4.1 connects motor 4.0 with cooler 5.0. Cooler 5.0 is connected with pump 1.0 via a line 5.1.

In the arrangement illustrated in FIG. 1, it is possible, due to valve 2.0, to route the operating medium either through the first or through the second circuit.

The first circuit, referred to as the "cooling circuit" in the following text, includes pump 1.0, valve 2.0, motor 4.0, cooler 5.0 as well as lines between these units. This first circuit is used in non-braking operation. In this instance, the operating medium serves solely as cooling medium.

The second circuit, referred to as the "combined cooling and braking circuit" in the following text, includes pump 1.0, valve 2.0, retarder 3.0, motor 4.0, cooler 5.0, as well as the associated lines. This second circuit is used in braking operation. In this instance, the operating medium performs both functions, that of braking and that of cooling.

The aforementioned units with their associated lines cause flow resistances. The difference between the total flow resistances of the two circuits should be small, i.e., they should be calculated to provide optimum results with regard to cooling and rigidity of the individual components. In order to minimize the differential between the cumulative resistances of both circuits, constructive measures may be undertaken in valve 2.0 or inside valve 2.0 in its line 2.2. Lines 2.2 and 3.1 may also be used to influence resistance by, for example, installing appropriate throttles.

Combinations are also possible. Further, measures are possible which would enable bypassing of valve 2.0, for example, by use of a switched bypass line from pump 1.0 to line 3.1 in the retarder 3.0.

In the embodiment of FIG. 1, valve 2.0 is equipped with both positions I and II. In position I, the operating medium is routed past the hydrodynamic retarder 3.0 in a so-called bypass, whereas in position II, 100% of the coolant flows through the hydrodynamic retarder 3.0.

Since there is a continuous flow of operating medium through the retarder 3.0 in position II, in order to ensure cooling of the motor 4.0, the minimum retarder braking torque MRet$_{min}$ is dependent on this flow volume for cooling of the motor 4.0. Thus, in position I at 100% coolant flow, there may be no lower deviation of a minimum retarder braking torque of MRet$_{min}$ because of the line resistances. There may be lower deviation of the minimum retarder braking torque if the valve is 2.0 set to position II and the operating medium is fed past the retarder 3.0. However, the retarder 3.0 is then inactive. Thus, the operating brake, for example a conventional friction brake, must always be installed in a vehicle for braking torques of between 0 and MRet$_{min}$.

Figure 1A:
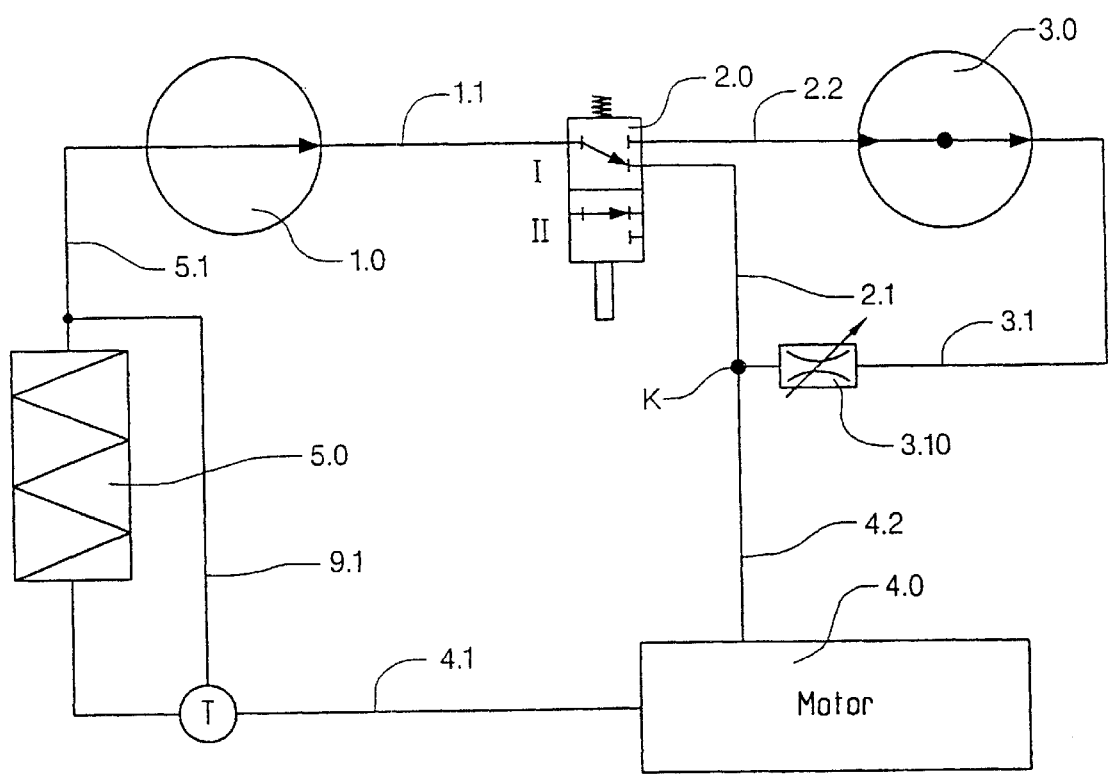
FIG. 1A is a schematic view of a second embodiment of a drive unit of the present invention, including a throttle in the retarder discharge line.

FIG. 1A shows an arrangement in accordance with FIG. 1 in which a throttle 3.10 is provided in line 3.1 for adjustment of the retarder braking torque. With throttle 3.10, the flow volume of cooling or operating medium and thereby the braking torque may be adjusted to values between a maximum retarder breaking torque MRet$_{max}$ and the established minimum retarder braking torque MRet$_{min}$. This throttle 3.10 is adjustable between 0 and 100% opening or closing. Since the throttle 3.10 permits total closing, it is possible to replace the return valve 7.0 with throttle 3.10. If the throttle 3.10 did not permit total closing, then line 2.1 would need to accommodate a return valve 7.0, as already illustrated in FIG. 1. It would also be possible to design the pump 1.0 with an adjustable speed to control or regulate the through flow volume.

Figure 1B:
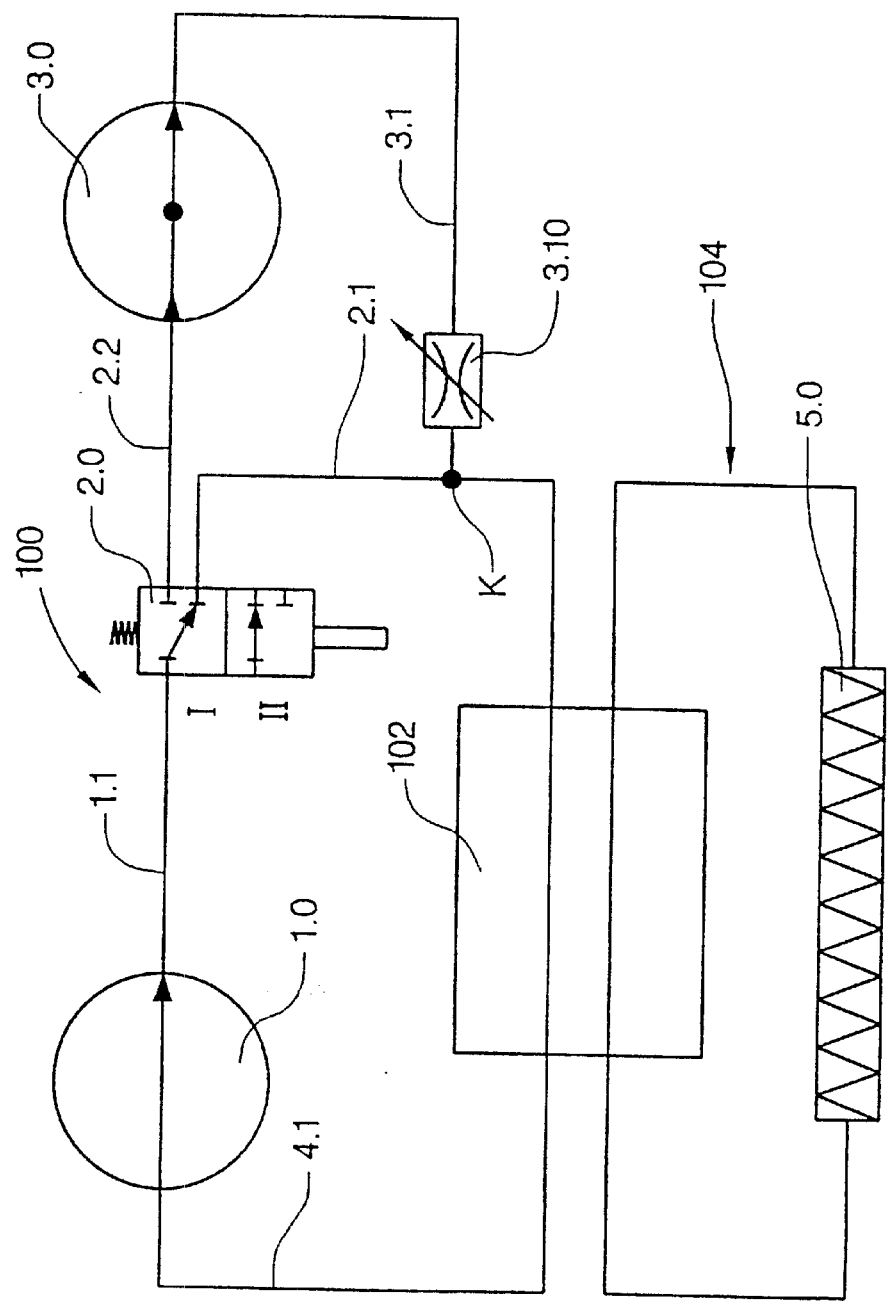
FIG. 1B is a schematic view of a third embodiment of a drive unit of the present invention, including a coolant circuit separated from the operating medium circuit.

FIG. 1B illustrates another embodiment of the invention, in which the cooling circuit and the circuit for the operating medium for the retarder are separated. The operating medium could, for example, be oil. The operating circuit 100 includes a pump 1.0 and a valve 2.0. Valve 2.0 controls the operating medium flow in position II through feed line 2.2 and retarder 3.0, as well as in position I through bypass line 2.1 past the retarder 3.0. The operating medium volume in the retarder 3.0 is regulated by adjustment of throttle 3.10 when the valve 2.0 is in position II. In position II, MRet$_{min}$ at 100% coolant through-flow as shown in the layout in FIG. 1 or 1A, is determined by the external line resistances. The heat generated during braking operation is released in the heat exchanger 102 to the coolant circuit 104, which includes the cooler 5.0. In place of the throttle 3.10, a speed controlled pump 1.0 having a changeable feed capacity could be used instead of a pump having a constant capacity.

Figure 8:
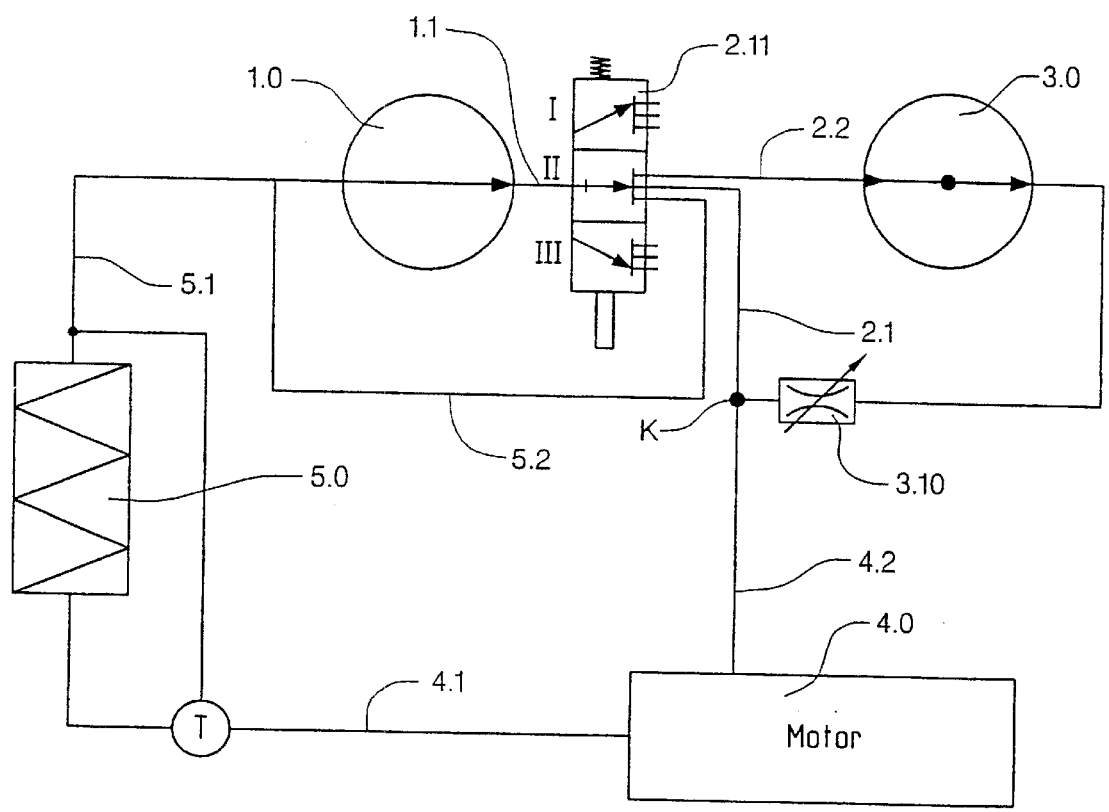
FIG. 8 is a schematic view of an eleventh embodiment of a drive unit of the present invention, whereby a portion of the coolant volume is routed directly to the pump suction side.

With the continuous control valve 2.10 illustrated in FIG. 2, which can be used in positions I and II, instead of the valve 2.0 which is shown in FIG. 1, it is possible to achieve retarder braking torques which are below the previously defined MRet$_{min}$. A control concept for this is illustrated in FIG. 8.

A lower deviation is achieved by separating the total coolant flow in line 1.1, with the help of the continuously regulating valve 2.10, into two partial flows. One flow is through line 2.2 to the retarder 3.0 and the other flow is through line 2.1 past the retarder 3.0. The continuously regulating valve 2.10 permits that the partial flow running through the retarder 3.0 and the partial flow running past the retarder 3.0 may be adjusted as desired, for example by use of a regulating piston. Here, the relationship $$G_{1.1} = xG_{1.1} + (1-x)G_{1.1}$$
$$= T_{2.1} + T_{2.2}$$

is always adhered to with $0 \leq x \leq 1$, whereby $G_{1.1}$ denotes the total coolant flow in the cooling circuit and $T_{2.2}$ denotes the partial flow through the retarder and $T_{2.1}$ denotes the partial flow past the retarder. A limitation of this type of braking torque reduction is reached when the coolant volume that is fed through the retarder 3.0 is so small that the pressure in line 2.1 is lower than the pressure in junction K. In such an instance, the return valve 7.0 or the throttle 3.10 closes and the entire coolant volume is fed through the bypass.

The continuously regulating valve 2.10 of course, permits circulation of the total flow either in the combined cooling-braking circuit or only in the cooling circuit. If the intent is to build up retarder braking torques that are below the previously defined minimum retarder braking torque with the assistance of the arrangement illustrated in FIG. 2, then the total coolant flow $G_{1.1}$ that is required for cooling of the motor 4.0 is separated into two partial flows $T_{2.1}$ and $T_{2.2}$ by the continuously regulating valve 2.10. In this way, values may fall below MRet$_{min}$, as previously defined.

Figure 2:
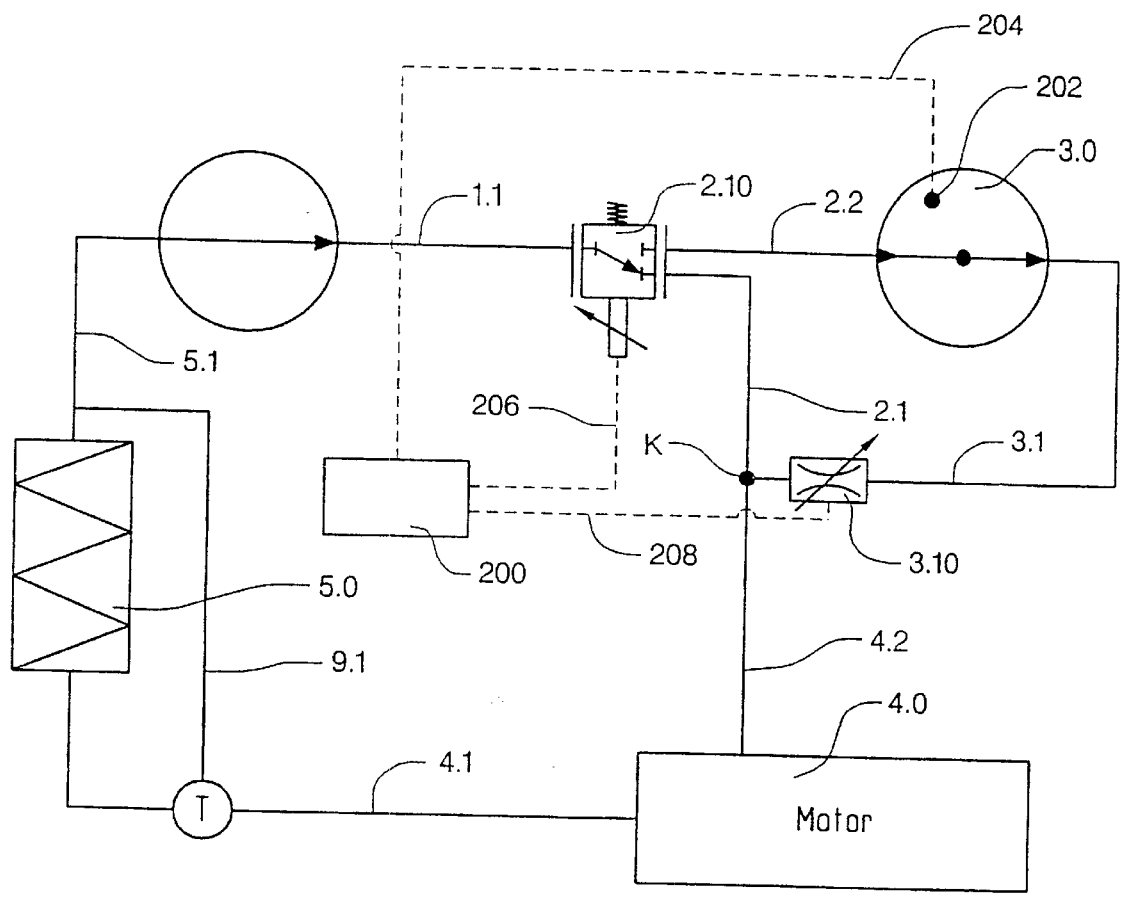
FIG. 2 is a schematic view of a fourth embodiment of a drive unit of the present invention, including a continuously regulating valve.
Figure 2A:
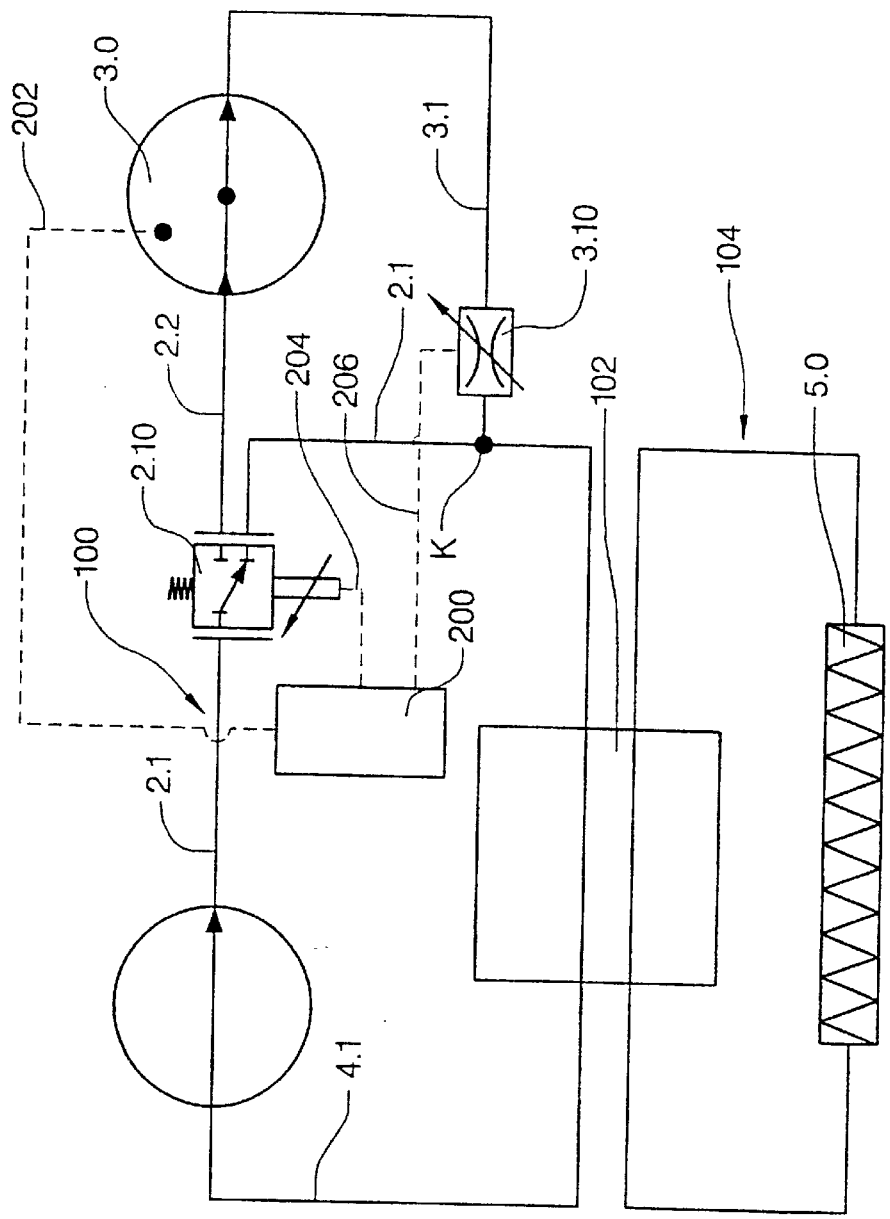
FIG. 2A is a schematic view of a fifth embodiment of a drive unit of the present invention, including separate circuits in accordance with FIG. 2 and a continuously regulating valve.

FIG. 2A shows an embodiment of the invention with separate circuits 100, 104 in accordance with FIG. 1B. Here, valve 2.0 is replaced by control valve 2.10.

Figure 3:
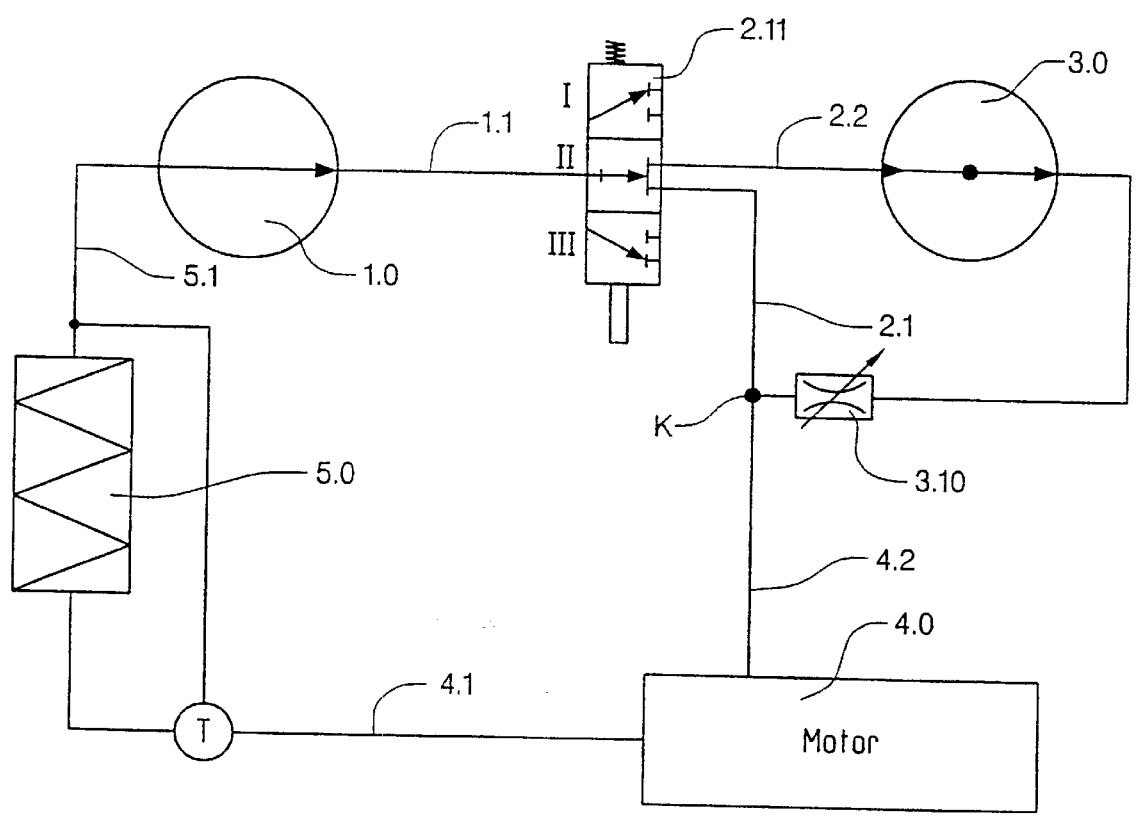
FIG. 3 is a schematic view of a sixth embodiment of a drive unit of the present invention, including a 3-position valve.
Figure 4:
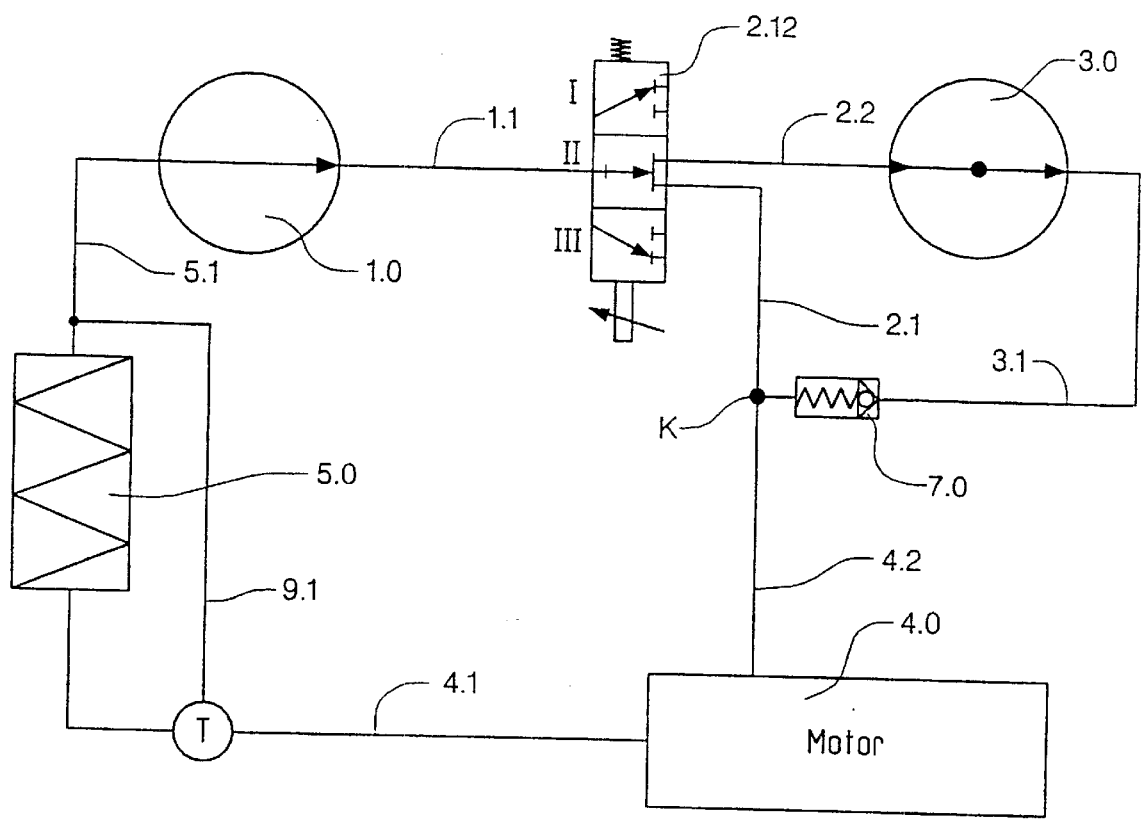
FIG. 4 is a schematic view of a seventh embodiment of a drive unit of the present invention, including a 3-position valve, whereby the second position permits continuous adjustment.
Figure 5:
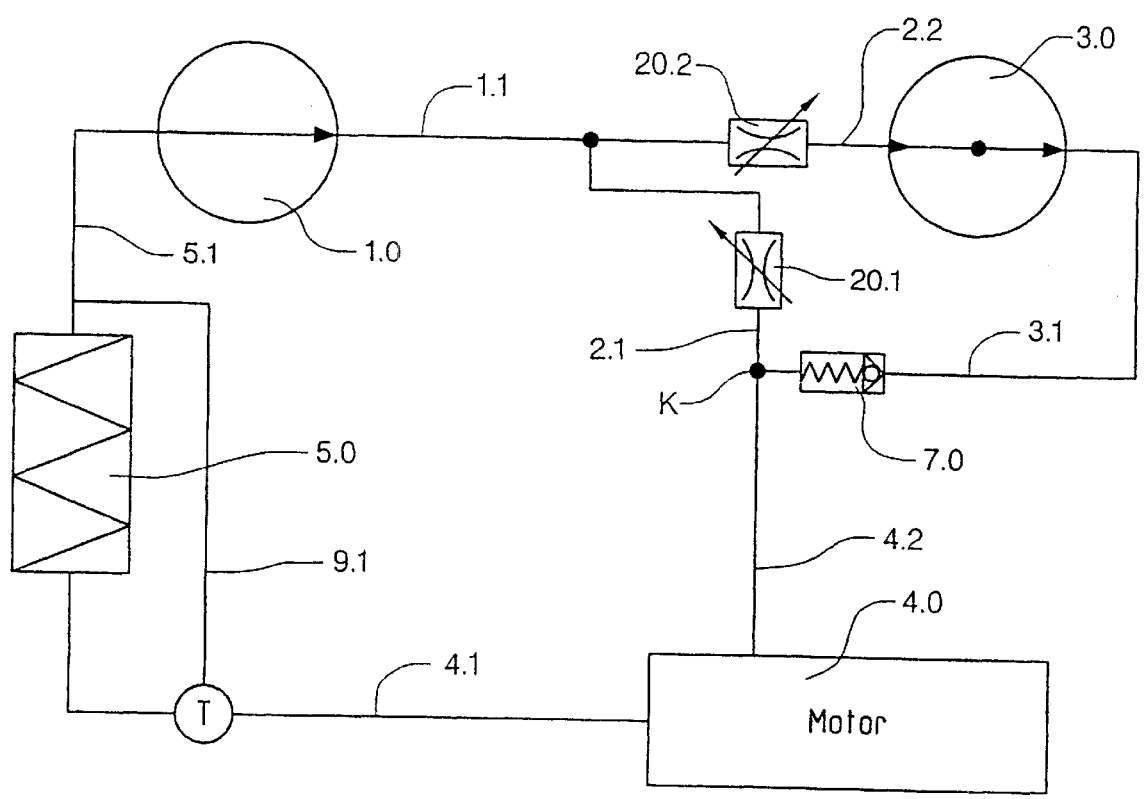
FIG. 5 is a schematic view of an eighth embodiment of a drive unit of the present invention, including a primary retarder and throttles as devices for adjustment for the partial flows.

FIG. 2 and FIG. 2A show arrangement examples of the control/regulating unit in accordance with the invention, for arrangement layouts in FIGS. 3 through 5. The control/regulating unit 200 can be connected to a sensor 202 in order to measure the retarder braking torque MRet. An actual value signal of the retarder braking torque can be recorded with sensor 202. This actual value signal is compared with a desired value for the retarder braking torque which is stored in the control/regulating unit 200, and which, for example, may be dependent on the driving speed. According to the regulating or control concept described in FIG. 8, for example, control/regulating unit 200 triggers the continuously regulating valve 2.10 via line 206, or control/regulating unit 200 triggers throttle 3.10 via line 208, in order to adjust the desired value of the established retarder braking torque.

In addition to the described adjustment method during which a continuous comparison of the actual retarder braking torque with the desired retarder braking torque takes place, a simplified version of a control unit alone may be provided to adjust the retarder braking torque to an established value. In this scenario, no sensor 202 is necessary to determine the retarder braking torque.

FIG. 3 shows an alternate embodiment of the invention according to FIG. 2, whereby the total coolant flow is also separated into partial flows $T_{2.1}$ and $T_{2.2}$. Here, the continuously regulating valve 2.10 is replaced by a selector valve 2.11 having three positions I, II and III. In position I, the total flow is fed through the combined cooling and braking circuit which includes the retarder 3.0. In position III, the total cooling flow is fed past the retarder 3.0 through line 2.1, that is, it is circulated only in the cooling circuit. Valve position II permits separation of the total flow in line 1.1 into partial flows. In the illustrated design variation for selector valve 2.11, the separation into partial flows is rigidly adjusted in position II. For example, half of the total flow is fed through line 2.1 and the other half of the total flow is fed through line 2.2, that is, x=0.5. An expert would be able to vary the ratio x, or may install a valve that is equipped with more than three positions, thereby providing more positions in which separation of the total flow is effected. These positions are characterized in that the partial flows vary in each of the positions. For example, it is possible that in a four-position valve a separation of the total flow into partial flows $T_{2.1}$ and $T_{2.2}$ takes place in position II at a ratio of 30:70, and where in contrast, a separation of the total flow into partial flows $T_{2.1}$ and $T_{2.2}$ takes place in position III at a ratio of 70:30.

FIG. 4 illustrates an alternative design variation of FIG. 3, with a selector valve 2.12 which, in contrast to selector valve 2.11 according to FIG. 3, in position II includes a device with which the total flow $G_{11}$ may be separated into two adjustable partial flows $T_{2.2}$ and $T_{2.1}$. In position II, the selector valve 2.12 displays the same functional characteristics as the continuously regulating control valve 2.10 in FIG. 2.

FIG. 5 shows a design variation in which the devices for transporting the coolant flow in either the cooling-braking circuit or the coolant circuit, as well as for separation of the total flow $G_{1.1}$ into partial flows $T_{2.1}$ and $T_{2.2}$, are adjustable throttles 20.1 and 20.2 in lines 2.1 and 2.2, respectively. Throttles 20.1 and 20.2 are used in place of the valves illustrated in FIGS. 1 through 4. Appropriate adjustment of both throttles 20.1 and 20.2 allows transport of the coolant entirely through line 2.1, entirely through line 2.2, or partially through line 2.1 and partially through line 2.2. Partial flows $T_{2.1}$ and $T_{2.2}$ are freely adjustable when the throttles 20.1 and 20.2 are continuously changeable. A return valve 7.0 is also provided prior to junction K in line 2.1.

Figure 6:
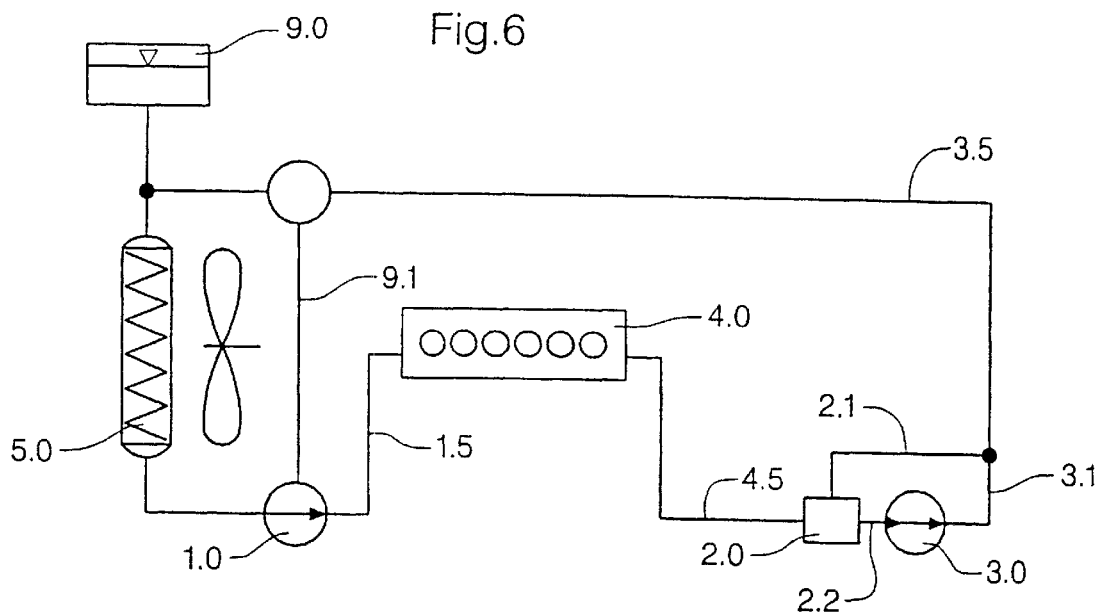
FIG. 6 is a schematic view of a ninth embodiment of a drive unit of the present invention, including a secondary retarder.

FIG. 6 illustrates a design variation with a pump 1.0 installed in the cooler circuit, as well as a retarder 3.0 functioning as a secondary retarder. Identical components as in FIGS. 1 through 5 carry the same reference numbers in FIG. 6. The reversing valve is identified as 2.0, the same as in FIG. 1. However, it will be obvious to the expert that valve 2.0 may be replaced with any of the valve variations illustrated in FIGS. 1 through 5. That is, valve 2.0 may be replaced by a continuously regulating control valve when the total flow $G_{4.5}$, which in the example is fed from the motor 4.0 to valve 2.0, is to be separated into partial flows $T_{2.1}$ and $T_{2.2}$.

In contrast to the design variation of the invention with the primary retarder illustrated in FIGS. 1 through 5, pump 1.0 is not connected directly with valve 2.0 in FIG. 6, but is instead connected through line 1.5 with motor 4.0. After cooling medium has run through motor 4.0, absorbing its heat, the cooling medium is fed to valve 2.0 through line 4.5.

The cooling medium, which at the same time is the operating medium of the retarder 3.0, is fed through the retarder 3.0 in one of the valve positions. In the other position, the cooling medium is fed past the retarder 3.0. When using valves other than those shown in FIGS. 2 through 5, separation into partial flows is possible.

According to FIG. 6, the cooling circuit includes pump 1.0, motor 4.0, valve 2.0 and cooler 5.0, as well as the lines between these units. In the available layout arrangements, the operation of water pump 1.0 can be motor speed dependent.

The compensator reservoir 9.0 ensures, through line 9.1, that the pressure at the pump suction side will be between a maximum value and a minimum value.

The combined cooling and braking circuit includes pump 1.0, motor 4.0, valve 2.0, retarder 3.0 and cooler 5.0.

The secondary retarder in the available design example is a retarder that is arranged on the transmission output side, and which is driven dependent on the speed of the vehicle.

Figure 7:
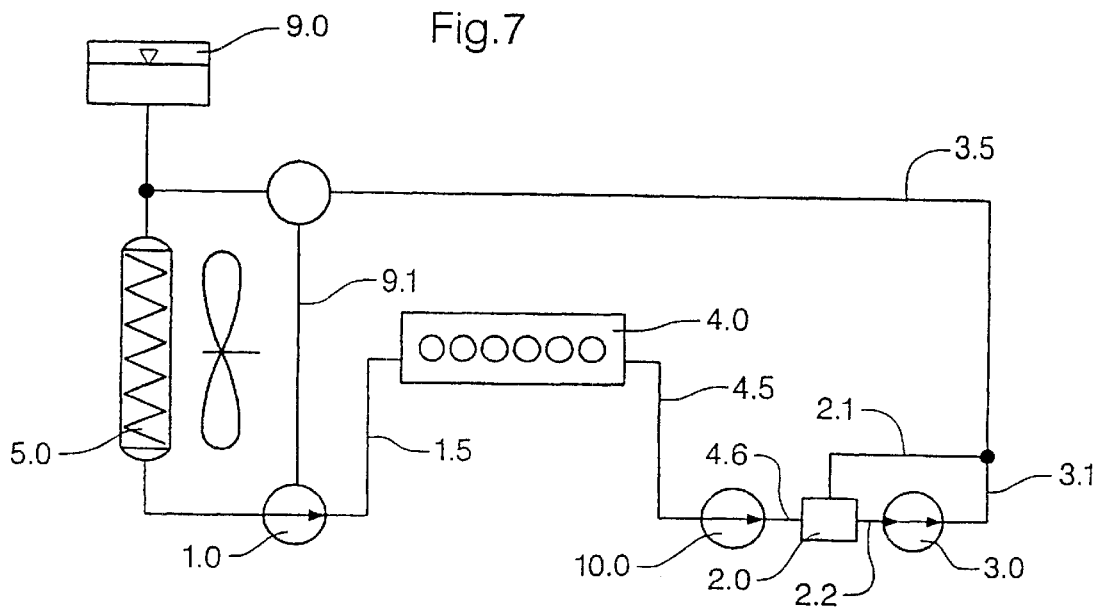
FIG. 7 is a schematic view of a tenth embodiment of a drive unit of the present invention, including more than one pump in the coolant circuit.

Below is a description of an arrangement which includes several pumps in the cooling circuit, whereby the representative variation described here is shown with two pumps in FIG. 7. Identical units are identified with identical reference numbers as in FIGS. 1 through 6. In addition to the pump 1.0 between cooler 5.0 and motor 4.0, there is a further pump 10.0 in the cooler circuit upstream in flow direction from the retarder 3.0. There is a further line segment 4.6 between pump 10.0 and the retarder 3.0. According to the available example, the retarder 3.0 is a secondary retarder, which does not present any limitations.

The valve, which may be any of the described valves, is installed upstream from the retarder 3.0, viewed in the flow direction. The combined cooling/braking circuit in the arrangement shown in FIG. 7 includes pump 1.0, motor 4.0, pump 10.0, valve 2.0 and retarder 3.0.

An advantage is achieved by utilizing two pumps, 1.0 and 10.0. The size of pump 1.0, whose speed is linked with that of the motor 4.0, may be reduced by the output of pump 10.0. The additional pump 10.0 can then, for example, be arranged as a transmission output side pump. That is, the output of pump 10.0 is dependent on the driving speed. Thus, the pumping output of pump 10.0 will be made available only when it is really needed, that is, at high driving speeds or in retarder operation mode. The water pump 1.0, which is running continuously with the motor speed, can be sized smaller. Water pump 1.0 can, therefore, be produced more economically.

Valve 2.0 is arranged immediately prior to retarder 3.0, viewed in the flow direction. It is also possible for pump 10.0 to be arranged following valve 2.0 and prior to the retarder 3.0. Obviously, more than two pumps may be installed analogously as described above, in the cooling and/or combined cooling-braking circuit.

FIGS. 8–11 illustrate further advancements of the invention, with which even lower retarder braking torques can be achieved than by merely separating the total flow into two partial flows $T_{2.1}$ and $T_{20.2}$.

Because of the pressure at junction K, only a minimal partial flow $T_{2.2}$, which is predetermined by the pressure, can be adjusted. If there is a lower deviation, the throttle 3.10 or the reversing valve 7.0 close, in order to prevent filling the retarder 3.0 due to a reverse flow.

Figure 9:
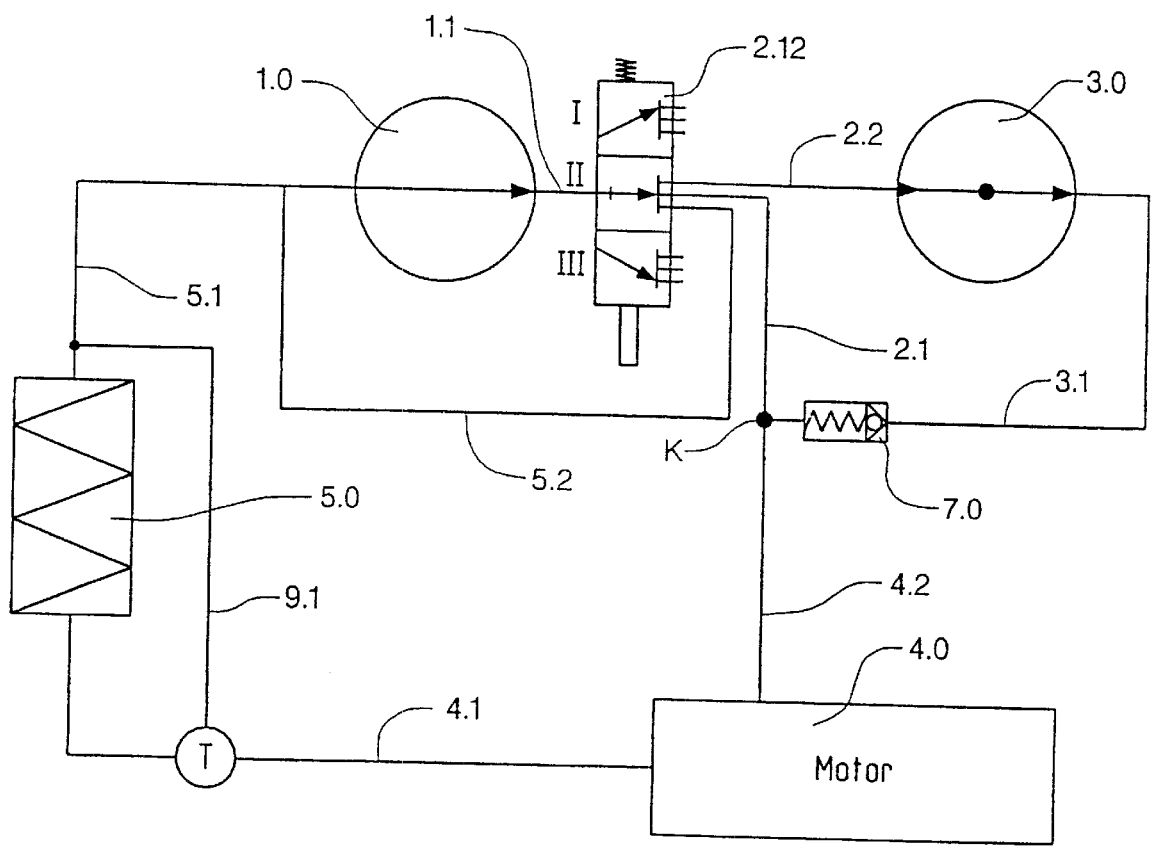
FIG. 9 is a schematic view of a twelfth embodiment of a drive unit of the present invention, including a continuously regulating valve.

The arrangement in FIGS. 8 and 9 provides for separation of the total flow into three partial flows $T_{2.2}$, $T_{2.1}$, and $T_{5.2}$. The flow at point K then includes $T_{2.1}$ and $T_{2.2}$. The following relationship holds: $T_{2.1}+T_{2.2}=G-T_{5.2}$. Thus, the pressure at point K in this instance is lower than that in the design variations illustrated in FIGS. 1–7. This makes it possible to send a smaller partial flow $T_{2.2}$ through a retarder 3.0 than in FIGS. 1–7, since the reversing valve 7.0 or the throttle 3.10 blocks line 2.2 only at lower pressures at point K. Thus, the retarder braking torque may be lowered below that which may be achieved with an arrangement illustrated in FIGS. 1–7. The partial flow $T_{5.2}$ is fed from the valve 2.11 to the suction side of pump 1.0 through line 5.2. Valve 2.11 is arranged analogously to FIG. 3 as a selector valve, whereby in position II the total flow is separated in a fixed ratio into three partial flows $T_{2.1}$, $T_{2.2}$ and $T_{5.2}$.

FIG. 9 illustrates a design variation of the invention in accordance with FIG. 8. A selector valve represents, in position II, a continuously regulating valve, analogously to FIG. 4. Identical elements as in previous illustrations are again identified with the same reference numbers.

Figure 10:
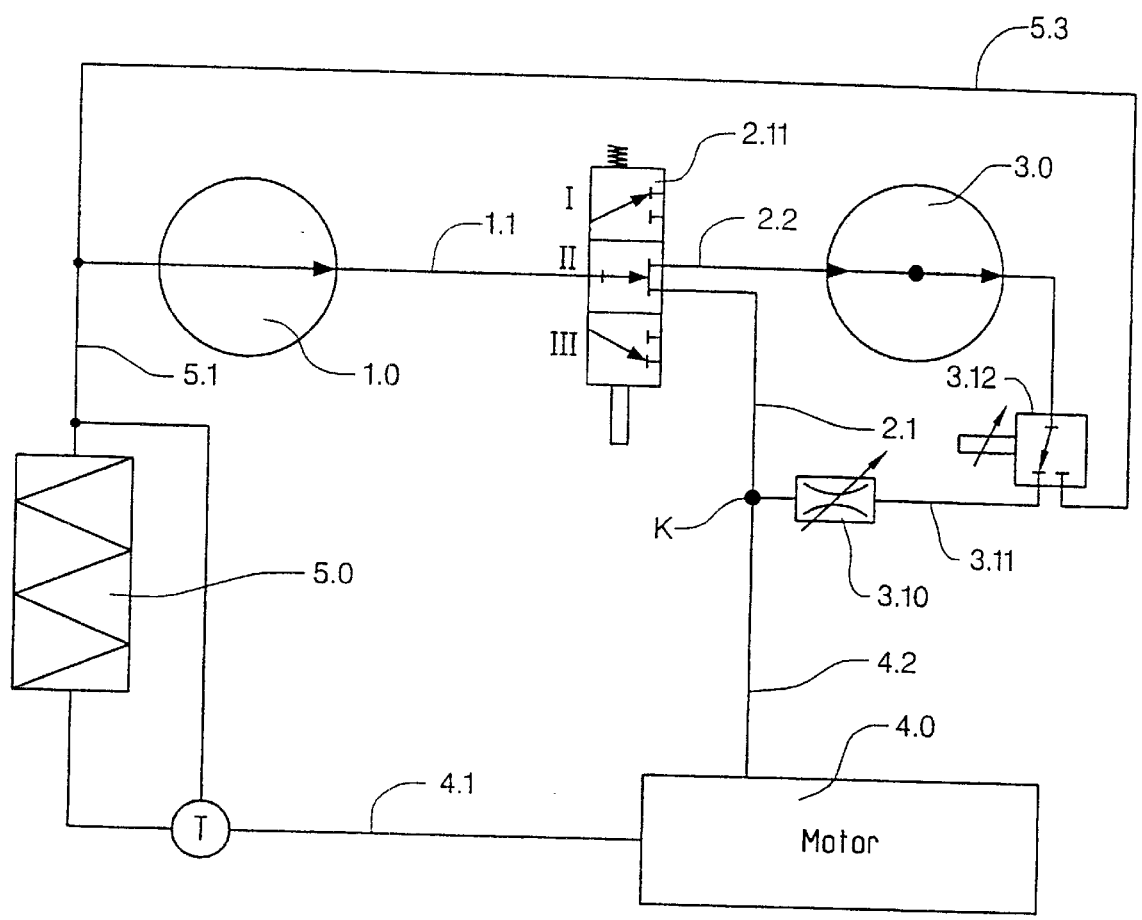
FIG. 10 is a schematic view of a thirteenth embodiment of a drive unit of the present invention, whereby a portion of the volume flowing through the retarder is routed directly to the pump suction side.

FIG. 10 shows another variation of the invention which permits that the minimum retarder braking torque may be lowered below that which is achievable with the arrangement in accordance with FIGS. 1–7. The arrangement in FIG. 10 provides that the partial flow $T_{2.2}$, which flows through the retarder 3.0 during braking operation, may be separated into two partial flows $T_{3.11}$ and $T_{5.3}$ with the help of valve 3.12. Valve 3.12 is shown as a continuously adjustable control valve. Partial flow $T_{5.3}$ is transported to the suction side of the pump 1.0 through line 5.3.

Figure 11:
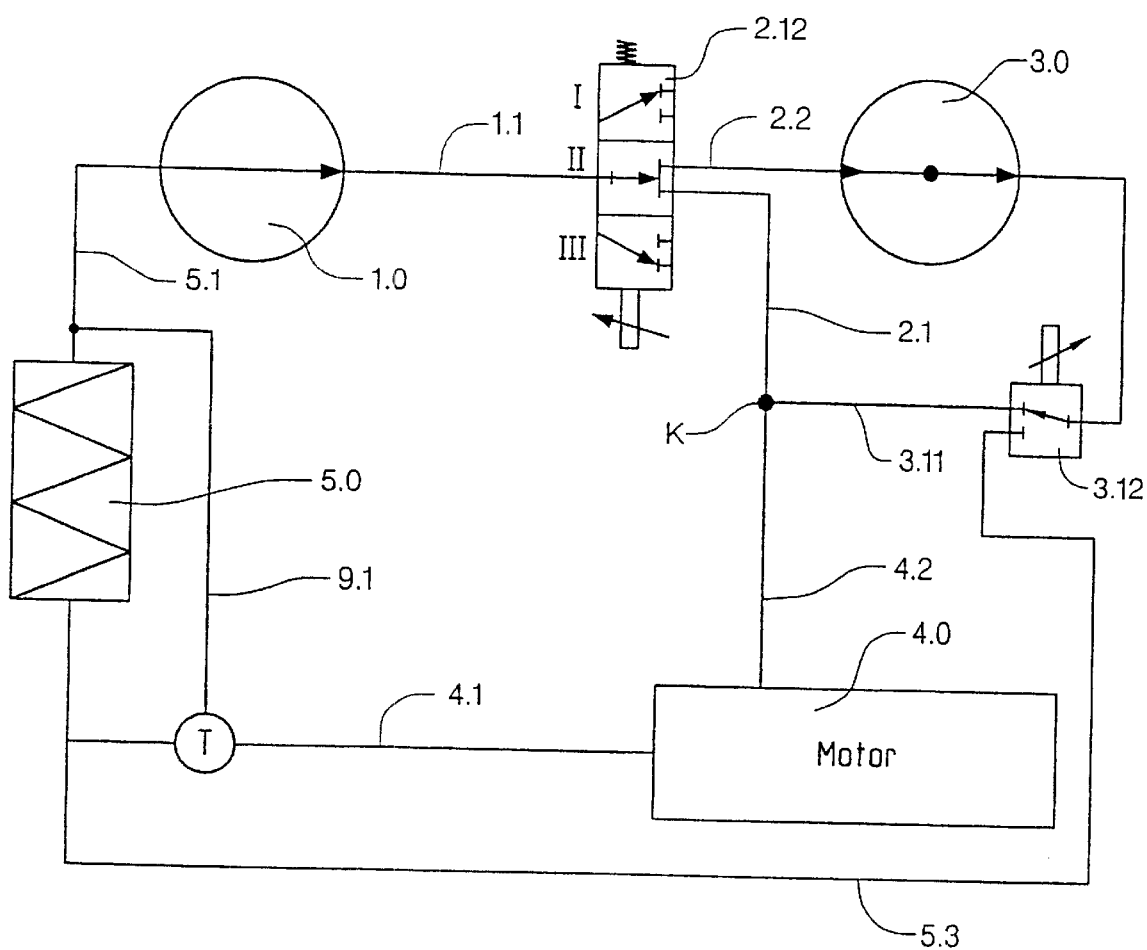
FIG. 11 is a schematic view of a fourteenth embodiment of a drive unit of the present invention, whereby a portion of the volume flowing through the retarder is routed directly through the cooler to the pump suction side.

FIG. 11 illustrates a design variation of the invention in accordance with FIG. 10. Again, partial flow $T_{2.2}$, which flows through the retarder 3.0, is separated into two partial flows $T_{3.11}$ and $T_{5.3}$. The separation into two partial flows is effected by valve 3.12 in a fixed ratio, which may be established as desired. In contrast to FIG. 10, the partial flow 5.3, which is transported to the suction side of the pump 1.0, is fed through the cooler 5.0. This has the advantage that the partial flow 5.3, which is heated by the retarder 3.0 working in braking mode, is cooled prior to entry into the pump 1.0. In contrast, in the arrangement according to FIG. 10, cooling prior to new entry into the retarder 3.0 is achieved only by mixing the heated partial coolant flow $T_{5.3}$ with the cold partial coolant flow $T_{5.1}$ that was fed through the cooler 5.0.

Figure 12:
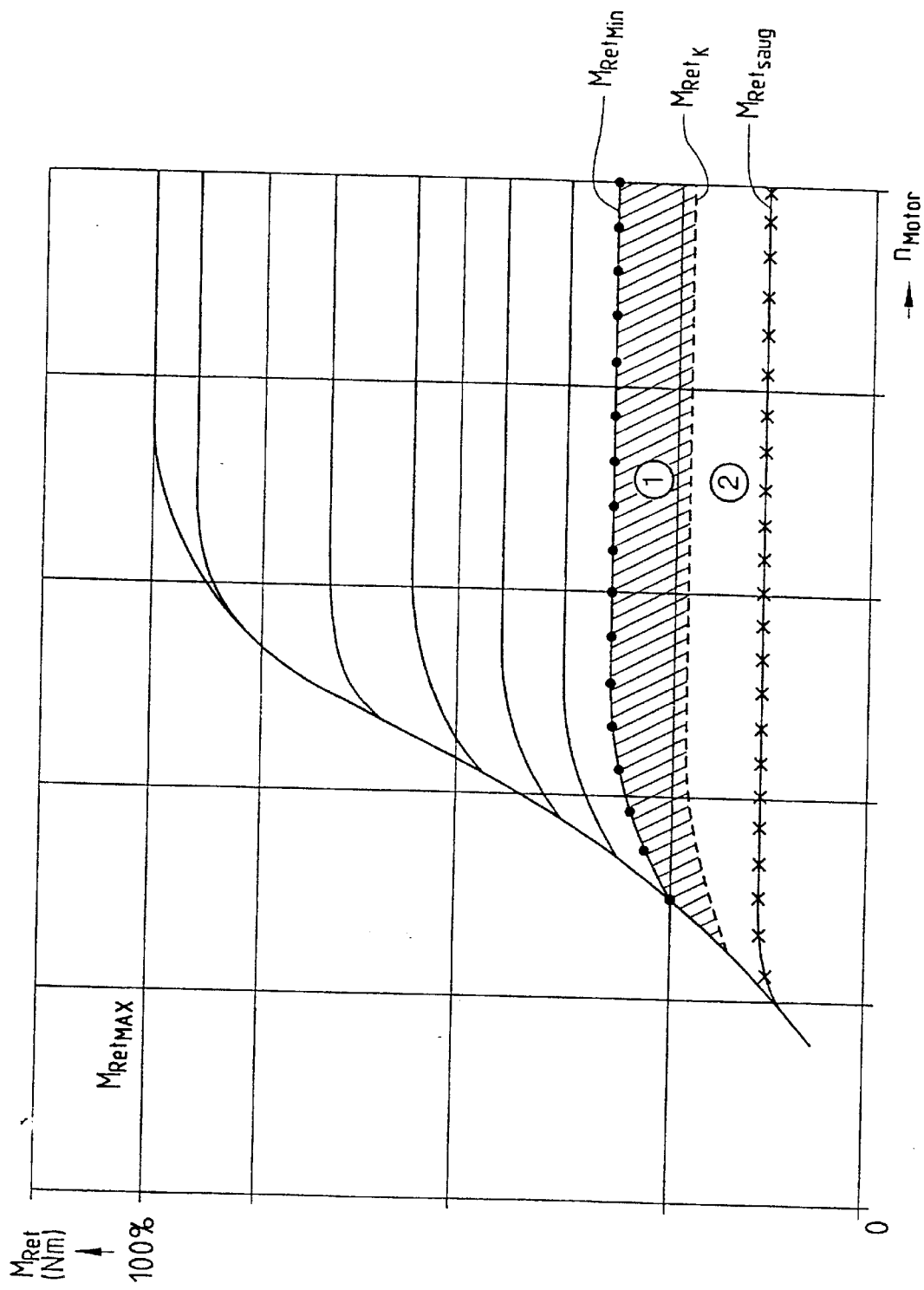
FIG. 12 is a plot of braking torque progression MRet of a primary retarder, shown depending on the motor speed.

FIG. 12 illustrates the progression of the retarder braking torque for the various design variations of the invention, without any limitations being visible.

For various driving situations, it may be desirable to limit the retarder braking torque to a maximum acceptable braking torque, i.e., to approximately between 70% and 85% of the maximum retarder braking torque $MRet_{max}$. In the design variations in accordance with FIGS. 1–1B, this is accomplished in that at a 100% coolant flow through the retarder 3.0, the coolant volume is adjusted, possibly with the help of throttle 3.10.

In order to prevent overheating of motor 4.0, a certain coolant volume must be delivered. Because of external resistances, this determines the minimum retarder braking torque $MRet_{min}$ at 100% coolant flow.

In the design variations in accordance with FIGS. 1–1B, a further reduction of the retarder braking torque to below $MRet_{min}$ is not possible. Only complete de-activation of the retarder 3.0 remains.

In accordance with an aspect of the invention which concerns the design variation in FIGS. 2 through 5, $MRet_{min}$ can be achieved by separating the operating medium flow into partial flows. This area is hatched and identified with 1. The lower limit of such an adjustment is the characteristic curve for $MRet_K$, for which there may be no lower deviation because of the pressure at junction K.

A further lowering of the minimum retarder braking torque is possible with design variations in accordance with FIGS. 8–11. In these arrangements, a partial flow of the total flow is fed directly to the pump suction side. Only a partial flow flows through the retarder 3.0 and bypass and meets again at point K. Such arrangements permit a reduction of $MRet_{min}$ to $MRet_{saug}$, and expand the area by that which is identified as 2.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive unit, comprising:

a motor;

a hydrodynamic retarder fluidly connected with said motor;

at least one pump fluidly connected with said motor;

at least one feed line to feed operating medium to said hydrodynamic retarder;

at least one bypass line including a first bypass line to convey said operating medium past said hydrodynamic retarder; and a first flow dividing device located upstream, in a direction of flow, of said hydrodynamic retarder, said first flow dividing device dividing said operating medium into at least two predetermined parts, a first predetermined part and a second predetermined part, said first predetermined part is directed to said hydro dynamic retarder by way of said at least one feed line, said second predetermined part is conveyed past said hydrodynamic retarder by way of said first bypass line.

2. The drive unit of claim 1, further comprising a second bypass line; wherein said first flow dividing device additionally divides said operating medium into a third predetermined part, said third predetermined part is conveyed by said second bypass line past said hydrodynamic retarder and by said first bypass line to a suction side of said at least one pump.

3. The drive unit of claim 1, further comprising a second flow dividing device configured to divide said operating medium downstream of said hydrodynamic retarder into a first retarder part flow and a second retarder part flow, whereby said first retarder part flow joins with said first bypass line and said second retarder part flow is conveyed past said hydrodynamic retarder to a suction side of said at least one pump.

4. The drive unit of claim 1, wherein said first flow dividing device is a valve device.

5. The drive unit of claim 4, wherein said valve device is a multiway valve having at least three operating positions including a first operating position, a second operating position and a third operating position, said multiway valve being configured such that in said first operating position said operating medium is fed via said first bypass line, in said third operating position said operating medium is fed via said at least one feed line and in said second operating position said operating medium is divided into said at least two predetermined parts, said first predetermined part being conveyed through said at least one feed line and said second predetermined part being conveyed through said first bypass line.

6. The drive unit of claim 4, wherein said valve device is a continuously controlling valve such that a division of flow into said first predetermined part and said second predetermined part is accomplished by one of stepless regulation and finely graduated steps.

7. The drive unit of claim 1, further comprising:
a combined cooling and braking circuit, said at least one feed line being a component thereof; and
a cooling circuit, said first bypass line being a component thereof.

8. The drive unit of claim 7, wherein said at least one pump includes a first pump and a second pump, said second pump is arranged in at least one of said cooling circuit and said combined cooling and braking circuit.

9. The drive unit of claim 1, wherein said at least one pump includes a first pump and a second pump, said second pump is arranged downstream of said first flow dividing device.

10. The drive unit of claim 1, wherein said flow dividing device include at least one of restrictors and a controllable pump.

11. The drive unit of claim 1, wherein said hydrodynamic retarder is a primary retarder.

12. The drive unit of claim 1, wherein said hydrodynamic retarder is a secondary retarder.

13. The drive unit of claim 1, further comprising a heat exchanger configured to transfer heat from said motor, wherein said operating medium is not directed to said motor.

14. The drive unit of claim 1, further comprising a regulating device for setting a predetermined braking torque, whereby said regulating device comprises at least one control/regulating unit adjustingly connected to said first flow dividing device such that based on said predetermined braking torque at least a part of said operating medium is conveyed via said at least one feed line and at least a part of said operating medium is conveyed via said at least one bypass line.

15. The drive unit of claim 14, further comprising a second flow dividing device arranged downstream of said hydrodynamic retarder.

16. A method of adjusting a retarder braking torque of a drive unit, whereby a predetermined braking torque of said retarder is adjusted, comprising the steps of:
dividing a flow of an operating medium into at least two flows including a first predetermined part and a second predetermined part, said dividing step is performed, in a direction of flow, direction prior to said retarder;
conveying said first predetermined part through a feed line and through said retarder; and
conveying said second predetermined part past said retarder via a bypass line.

17. The method of claim 16, wherein said at least two flows additionally include a third predetermined part and further comprises the step of conveying said third predetermined part, via a second bypass line, past said retarder, to a suction side of a pump.

18. The method of claim 16, further comprising the steps of:
subdividing said first predetermined part, which is guided by said retarder, into two retarder parts including a first retarder part and a second retarder part;
joining said first retarder part with a flow of said bypass line; and
conveying said second retarder part past a motor to a suction side of a pump.

19. The method of claim 16, wherein said dividing step is accomplished with a flow dividing device located upstream of said retarder.

20. The method of claim 19, wherein said flow dividing device is located downstream of said retarder.

* * * * *